(12) United States Patent
Schatz

(10) Patent No.: US 11,421,562 B2
(45) Date of Patent: Aug. 23, 2022

(54) ACTUATOR FOR HYDRAULIC VALVE

(71) Applicant: ECO Holding 1 GmbH, Marktheidenfeld (DE)

(72) Inventor: Bernhard Schatz, Ostfildern (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 180 days.

(21) Appl. No.: 16/923,329

(22) Filed: Jul. 8, 2020

(65) Prior Publication Data

US 2021/0010396 A1 Jan. 14, 2021

(30) Foreign Application Priority Data

Jul. 8, 2019 (DE) .......................... 102019118333.2

(51) Int. Cl.
| | |
|---|---|
| *F16K 31/06* | (2006.01) |
| *F01L 1/344* | (2006.01) |
| *H01F 7/16* | (2006.01) |
| *H01F 7/08* | (2006.01) |

(52) U.S. Cl.
CPC ........ *F01L 1/3442* (2013.01); *F16K 31/0675* (2013.01); *F16K 31/0686* (2013.01); *H01F 7/081* (2013.01); *H01F 7/16* (2013.01); *F01L 2001/34426* (2013.01)

(58) Field of Classification Search
CPC ............. F16K 31/0675; F16K 31/0686; F16K 31/0689; H01F 7/081; H01F 7/16; H01F 7/1607; H01F 2007/086
See application file for complete search history.

(56) References Cited

U.S. PATENT DOCUMENTS

| | | | |
|---|---|---|---|
| 8,248,195 B2 * | 8/2012 | Ryuen .................. | H01F 7/1607 335/282 |
| 8,651,827 B2 * | 2/2014 | Usui .................... | F02M 63/007 417/295 |
| 8,928,440 B2 * | 1/2015 | Matsumoto .......... | H01F 7/1607 335/282 |
| 9,651,164 B2 * | 5/2017 | Arao .................... | F16K 31/0675 |
| 2003/0047699 A1 * | 3/2003 | Sakata ................. | H01F 7/1607 251/129.15 |
| 2009/0039992 A1 * | 2/2009 | Ryuen .................. | H01F 7/1607 335/255 |
| 2014/0026836 A1 * | 1/2014 | Matsumoto ........... | H02K 41/02 123/90.15 |

(Continued)

FOREIGN PATENT DOCUMENTS

| | | |
|---|---|---|
| DE | 4217871 A1 | 3/1995 |
| DE | 19716517 A1 | 10/1998 |

(Continued)

*Primary Examiner* — Matthew W Jellett
(74) *Attorney, Agent, or Firm* — Von Rohrscheidt Patents

(57) ABSTRACT

An actuator for a hydraulic valve for a cam phaser, the actuator comprising a magnetisable actuator housing that envelops a magnet coil; a pole group that is arranged in a housing receiver opening of the magnetisable actuator housing, wherein the pole group includes a pole core and a pole tube, wherein the pole core and the pole tube are connected by a connection bar and the pole core is connected with the connection bar by a pole core cone, or the pole tube is connected with the connection bar by a pole tube cone, wherein an armature is received axially movable in an inner space of the pole group.

10 Claims, 5 Drawing Sheets

(56) References Cited

U.S. PATENT DOCUMENTS

2018/0304875 A1\* 10/2018 Yamaguchi ......... F16K 31/0665

FOREIGN PATENT DOCUMENTS

| DE | 102006015233 A1 | 10/2007 |
| DE | 202008017033 U1 | 5/2010 |
| DE | 102009006355 A1 | 7/2010 |
| DE | 102013214647 A1 | 5/2014 |

\* cited by examiner

ACTUATOR FOR HYDRAULIC VALVE

RELATED APPLICATIONS

This application claims priority from and incorporates by reference German patent application DE 10 2019 118 333.2 filed on Jul. 8, 2019 which is incorporated in its entirely by this reference.

FIELD OF THE INVENTION

The invention relates to an actuator for a hydraulic valve and to a hydraulic valve, in particular a hydraulic valve for a cam phaser of a motor vehicle.

BACKGROUND OF THE INVENTION

It is known in the art to use magnetic actuators also designated as electro magnets to axially move a piston, e.g. a piston of a hydraulic valve which is used for a cam phaser system, wherein the hydraulic valve is advantageously configured as a central valve. The central valves are fixed at a cam shaft that is to be adjusted which requires corresponding installation space. This means that an axial length of the central valve that includes an axial length of the actuator determines the installation space of the cam shaft.

An electro magnet is known from DE 42 17 871 A1 that includes a rod that completely penetrates the armature in an axial direction in order to support the armature that performs an axial movement. In order to achieve a so called rod support which is also designated as rod-rod support the armature is supported on the rod in its entirety and is in contact with the rod over an entire axial extension of the rod.

An essential advantage of a rod-rod support compared to a rod-belly or a pure belly support is in particular low friction between the armature and an inner surface of the pole group that includes the armature which helps to achieve a longer service life. Another advantage is that a magnetic separation layer between the armature and the pole group common in the prior art is not required since the armature does not touch the pole group due to the air gap. This makes coating and a subsequent grinding step or an additional thin separation sleeve between the armature and the pole group unnecessary.

The armature is configured as a cylindrical component and includes a central receiving opening in order to receive the rod, wherein the rod is fixed at the armature so that an armature force caused by running current through the actuator can be transferred to the hydraulic valve. Thus, the rod is in contact with the hydraulic valve, in particular with a movable piston of the hydraulic valve.

BRIEF SUMMARY OF THE INVENTION

Thus, it is an object of the invention to provide an actuator with a rod-rod support that has a high force density and a reduced axial length. It is another object of the invention to provide an improved hydraulic valve that has magnetic actuator with a high force density and that is producible in a cost effective manner.

The object is achieved by an actuator for a hydraulic valve for a cam phaser, the actuator comprising a magnetisable actuator housing that envelops a magnet coil; a pole group that is arranged in a housing receiver opening of the magnetisable actuator housing, wherein the pole group includes a pole core and a pole tube, wherein the pole core and the pole tube are connected by a connection bar and the pole core is connected with the connection bar by a pole core cone, or the pole tube is connected with the connection bar by a pole tube cone, wherein an armature is received axially movable in an inner space of the pole group, wherein an axial movement of the armature is limited at a first armature face by a terminal cover of the pole group that is arranged opposite to the first armature face and the axial movement of the armature is limited at a second armature face by a support disc that is arranged opposite to the second armature face, wherein the armature is supported by a rod that extends through the an entirety of the armature in an axial direction and provides a rod-rod support, wherein the armature is fixed at the rod, wherein a cavity is arranged between the armature and the rod and extends from the rod in a radial direction and in the axial direction, wherein the cavity is configured to at least partially receive the terminal cover or the support disc, and wherein the rod-rod support is formed by supporting the rod in the terminal cover and in the support disc. Advantageous embodiments and advantages of the invention can be derived from the dependent claims, the description and the drawing figures.

An actuator for a hydraulic valve is proposed, in particular for a hydraulic valve for a cam phaser, the actuator including a magnetisable actuator housing that envelops a magnet coil. Furthermore the actuator includes a pole group that is arranged in a housing receiver opening of the actuator housing wherein the pole group includes at least a pole core and a pole tube, wherein the pole core and the pole tube are connected by a connection bar. The pole core is connected with the connection bar by a pole core cone, and/or the pole tube is connected with the connection bar by a pole tube cone. An axially movable armature is received in an inner space of the pole group, wherein an armature movement is limited in an axial direction at a first face of the armature by a terminal cover of the pole group arranged opposite to the first face of the armature and limited in the axial direction by a support disc that is arranged opposite to a second face of the armature. The armature is supported by a rod that penetrates the armature in its entirety in the axial direction and provides a rod-rod bearing, wherein the armature is fixed at the rod.

The armature according to the invention includes a cavity between the armature and the rod in order to reduce the installation space wherein the cavity extends from the rod in a radial and in an axial direction, wherein the cavity is configured to at least partially receive the terminal cover and/or the bearing cover and the rod - rod support is formed by supporting the rod in the terminal cover and in the support disc.

This means put differently that the armature includes a cavity, wherein an armature ring of the armature that is oriented towards the pole group envelops the cavity. This means put differently that an armature cross sectional surface is reduced by the cavity in the portion of the armature ring. The cavity does not extend through the entirety of the armature in the axial direction since this would lead to a reduction of the magnet force like simply making the armature shorter. Therefore the cavity is a space that is enveloped by the armature ring associated with the armature wherein the rod extends through the space. The space or the cavity is also filled with hydraulic fluid. The advantage is providing a weight reduced actuator, however, a basis is also provided to provide an actuator that is much shorter than the prior art while maintaining almost the same power. The high force density is in particular also achieved in that the components which form the metal loop for implementing a magnetic flux are connected with each other and/or pressed together so that no air gap between the components impedes and/or weakens a possible magnetic flux. These components include the pole group including the pole tube, the pole core and the connection bar and the actuator housing and a pole disc. The installation space is optimized in that the rod bearing of the terminal cover or the bearing disc is at least partially moved into the installation space.

The cavity space can envelop a section of the rod, however, it is simpler from a fabrication point of view to configure the cavity annular so that it completely envelops the rod.

In another embodiment of the actuator according to the invention the cavity is configured outside of a pole gap that is provided between the pole tube and the pole core. Since armature material of the armature is utilized to the highest extent in a pole gap formed between the pole tube and the pole core, in particular in the recited embodiment it is advantageous to reduce the armature cross section outside of this portion. Since the smallest possible air gap is desired between the armature and the pole tube and the pole core a cavity diameter of the cavity in the recited portion can be increased without losing a large amount of magnet force which would occur when shortening the armature. The cavity can be formed at both faces of the armature.

In order to provide a secure connection between the rod and the armature the cavity is formed at the face that is arranged opposite to the terminal cover and/or at the face that is arranged opposite to the support disc as long as the cavity is formed at the face that is arranged opposite to the terminal cover and at the face opposite to the support disc and the fixed connection of the armature with the rod is configured between the cavity at the face opposite to the terminal cover and the cavity at the face opposite to the support disc.

In another embodiment of the actuator according to the invention a support opening is provided in the terminal cover and a support opening to support the rod is provided in the support disc. The terminal cover forms an end of the pole group in the axial direction when the pole group is configured in one piece so that an opening to support the rod can be introduced into the terminal cover integrated into the pole group in a cost effective manner, e.g. by a bore hole. Additional machining of the opening, e.g. honing, lapping and/or polishing can be performed in a cost effective manner to form a low friction sliding bearing since the opening can be reached easily for machining since it can be reached directly. The terminal cover can also be configured as a separate component, thus independently from the pole group. The additional bearing of the rod that is configured in the support disc is advantageous since it can also be formed in the bearing disc in a cost effective manner.

The bearing disc is typically produced independently from the pole tube and the pole core and typically joined into the pole group by a press fit after the armature is inserted into the interior of the pole group. Thus, the support disc is a simple disc shaped or cylindrical component into which an additional opening has to be introduced in order to implement the bearing. The bearing can also be produced in a simple and cost effective manner like in the terminal cover. The support disc can also be formed as a part of a bushing or of a pole plug. By the same token the support disc can also be configured integrally in one piece with the pole group, wherein the terminal cover is not integrally provided in one piece with the pole group in this case in order to improve assembly. The one piece configuration of the support disc with the pole core or the pole group has the advantage that there are no air gaps between the components that can reduce the magnetic flux.

By the same token it is conceivable to configure the pole tube and terminal cover integrally in one piece, wherein the support disc is not produced integrally in one piece in order to improve assembly. The integral provision has the advantage that there are no air gaps between the components that could reduce the magnetic flux.

In order to increase the support surface it is possible according to an advantageous embodiment of the invention that the terminal cover and/or the support disc includes an annular boss that is oriented towards the armature wherein the annular boss can protrude in its entirety into the cavity that is oriented towards the terminal cover. In order to improve magnetic flux within the armature the annular boss and the armature can respectively include corresponding bevels.

Advantageously the pole core, the connection bar, the pole tube and the optional cones are provided integral in one piece. A one piece integral pole group including at least the pole core and the pole tube has the advantage that a mechanical axis of the entire pole group can be defined when fabricating the pole group, in particular the component of the pole group receiving the armature and including the pole tube and the pole core and the connection bar so that an enveloping surface of the armature is advantageously designed since both axes of pole group and armature can be coaxially aligned, put differently can be configured completely coaxial in order to provide advantageous running properties of the armature.

In order to minimize transversal forces the armature has to be arranged in the pole group, in particular in the pole tube so that it moves concentric and it also has to be able to penetrate into a cone portion of the pole core or the pole tube in a concentric manner. When the armature is arranged concentric the transversal forces are balanced so that their sum is zero. The greater a deviation from the centric position the greater the resulting transversal forces. Due to the minimized transversal forces the sum of the forces provides a higher axial force and thus a higher magnet force. Thus, an integral one piece pole group has to be selected in order to achieve a high magnet force while keeping the armature volume low.

It is appreciated that the terminal cover can also be joined into the pole tube after fabricating the one piece pole group section including the pole tube, the pole core and the connection bar which further simplifies fabricating the bearing arranged in the terminal cover.

The armature is advantageously fixed at the rod so that a relative movement between the two components which could cause a malfunction of the hydraulic valve is prevented. Thus, it is advantageous and cost effective to press the rod into the armature or to fabricate the rod from a synthetic material and injection mold it into the armature in order to further reduce the weight of the actuator.

Advantageously the rod is configured as a massive or thick walled rod so that a bending can be prevented.

The invention furthermore relates to a hydraulic valve, in particular a hydraulic valve for a cam phaser including a control valve and an actuator moving the control valve.

The actuator according to the invention thus facilitates an installation space optimized hydraulic valve wherein the actuator is substantially reduced in axial length and weight while keeping the magnet force substantially constant wherein the hydraulic valve can also be used in small installation spaces and provides reliable operations.

BRIEF DESCRIPTION OF THE DRAWINGS

Further advantages can be derived from the subsequent drawing description. The drawings illustrate embodiments of the invention. The drawings, the description and the claims include several features in combination. A person skilled in the art will view the features individually and combine them into useful other combinations, wherein:

DETAILED DESCRIPTION OF THE INVENTION

Figure 1:
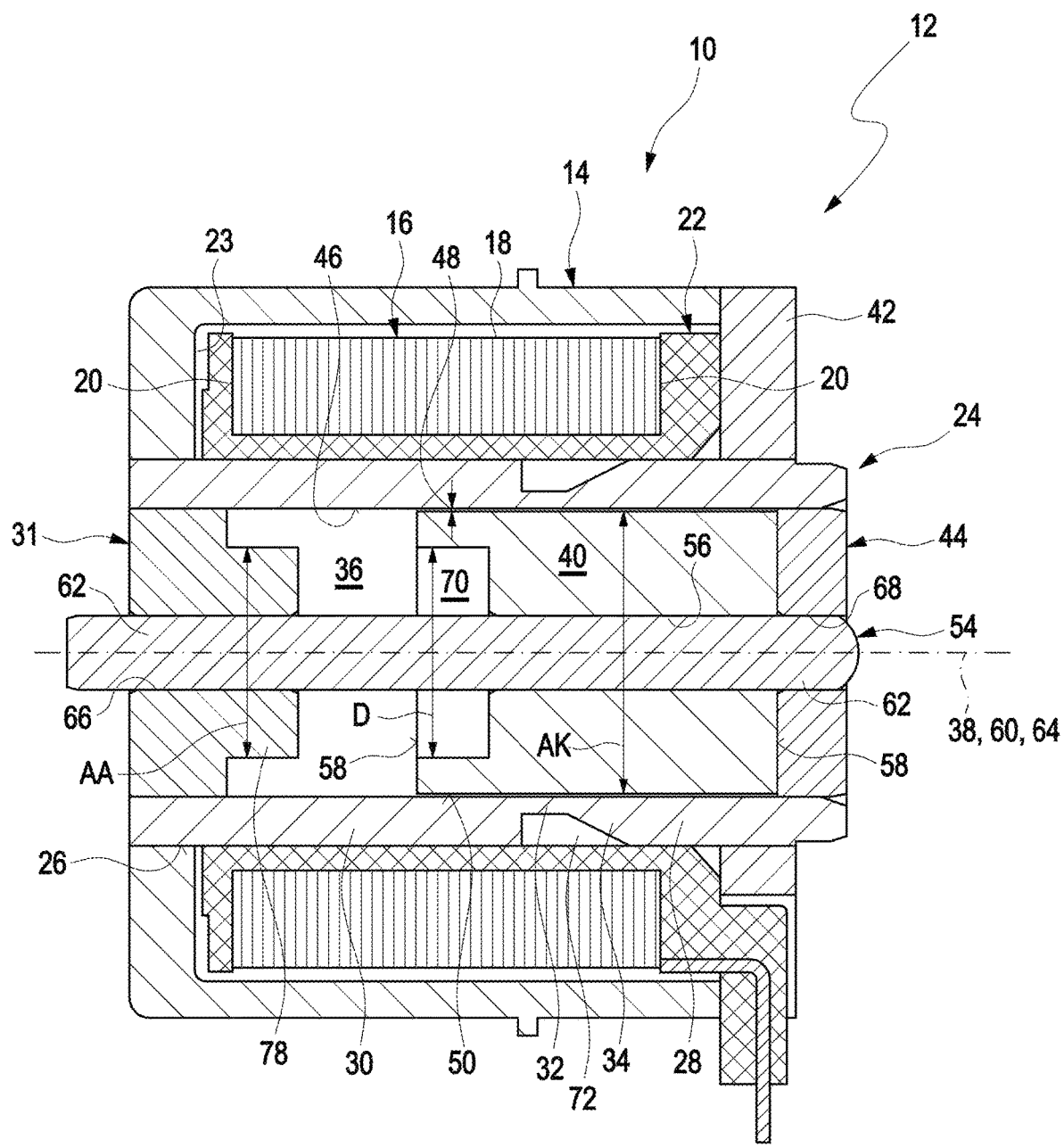
FIG. 1 illustrates a longitudinal sectional view of a first embodiment of an actuator according to the invention for a hydraulic valve according to the invention.

Identical or like components in the drawing figures are designated with identical reference numerals. The drawing figures show embodiments and do not limit the spirt and scope of the invention.

FIG. 1 illustrates a longitudinal sectional view of an actuator 10 according to the invention of a hydraulic valve 12 according to the invention. The hydraulic valve 12 which is not illustrated with respect to its hydraulic functions outside of the actuator 10 includes a control valve with a housing that includes hydraulic components including an axially movable and hydraulically flowable piston which is received in the housing axially movable in order to open and close flow through openings that are formed in the housing. The piston is positioned axially using the actuator 10.

The actuator 10 includes a magnetisable actuator housing 14 which envelops a magnet coil 16 at its outer circumference 18 and at least at one of the faces of the magnet coil 20. The magnet coil 16 is embedded or encased in a carrier element 22, advantageously made from synthetic material in order to provide electrical insulation. The carrier element 22 that is provided with the magnet coil 16 is received in a housing receiver opening of the actuator housing 14.

The carrier element 22 is arranged between the magnet coil 16 and a pole group 24 wherein the carrier element 22 at least partially envelops an enveloping surface 26 of the pole group 24.

The pole group 24 which is configured hollow cylindrical in this embodiment is formed by a pole core 28 and a pole tube 30 which are connected with one another in an axial direction by a connection bar 32. The pole core 28, the pole tube 30 and the connection bar 32 are integrally configured in one piece. The pole core 28 is oriented towards the piston, whereas the pole tube 30 is arranged at a face of the pole group 24 that is oriented away from the piston and almost closes the pole group by a terminal cover 31 so that the pole tube is oriented away from the piston.

Figure 2:
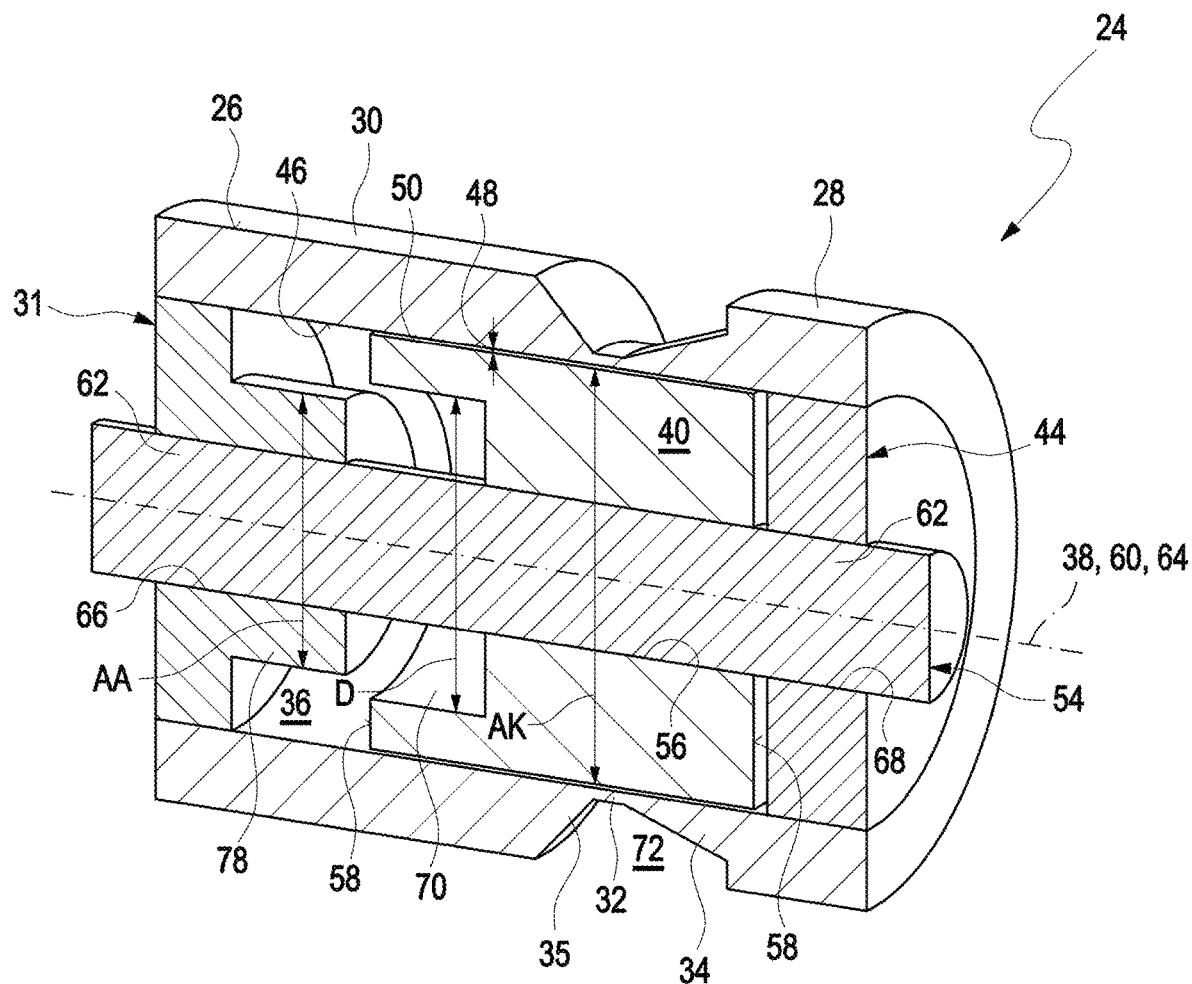
FIG. 2 illustrates a perspective view of a longitudinal sectional view of a pole group of the actuator including an armature in a second embodiment.

The connection bar 32 is configured hollow cylindrical and connected with a pole core cone 34 at a side that is oriented towards the pole core 28. By the same token the connection bar 32 can be connected with a pole tube cone of the pole tube 30 at a side that is oriented towards the pole tube 30. The pole core 28 and the pole tube 30 can also include respective cones wherein the connection bar 32 is arranged between the cones as depicted in FIG. 2 in another embodiment of the actuator 10 according to the invention in which the pole tube 30 includes the pole tube cone 35. An armature 40 is arranged in an inner tube 36 of the pole group 24 that includes a longitudinal axis 38 so that the armature is movable in a direction of the longitudinal axis 38.

In order to simplify assembly the actuator housing 14 is configured hollow cylindrical and includes a pole disc 42 that envelops the pole core 28 in a portion of an end of the actuator housing that is oriented towards the piston wherein the pole disc is supported in the axial direction at the support element 22 and the actuator housing 14. By the same token the pole disc 42 can also be pressed into the actuator housing 14. This has the advantage that the actuator housing 14 can be configured hat shaped or pot shaped, wherein the support element 22 that supports the magnet coil 16 can simply be inserted into the actuator housing 14 and the actuator housing can be covered by the pole disc 42 that is configured to receive the pole group 24.

The magnet coil 16 that is arranged in the actuator housing 14, the pole group 24 with the armature 40 and the pole disc 42 form the essential portion of the actuator 10 of the hydraulic valve 12.

The interior space 36 that is partially filled with the hydraulic fluid is essentially closed relative to the piston by a support disc 44. The support disc 44 is arranged to limit an axial movement of the armature 40 and to prevent an excessive outflow of hydraulic fluid that it received in the cavity 36. Thus, the hydraulic fluid that is provided to facilitate low friction movement and attenuation of the armature 40 can pass through corresponding movement gaps beyond the hydraulic piston and/or its housing, however, the support disc 44 prevents an excessive or complete emptying.

Furthermore free surfaces in the cavity 36 in front of or behind the armature 40 are advantageously sized identically so that the hydraulic fluid is moved in the pole core 24 when the armature 40 moves so that the hydraulic fluid does not have to move out of the cavity 36 besides at the bearings. When the armature 40 is moved hydraulic fluid that is provided in the cavity 36 can be moved in the armature, and does not have to be drained from the cavity 36 to allow a quick movement of the armature 40. The pressure caused by the equally sized surfaces when moving the armature 40 due to the required displacement in the volume in front of and behind the armature 40 is sufficient to implement a quick reaction time of the hydraulic valve 12 while simultaneously providing advantageous damping of the armature 40 and accordingly damping of the piston of the hydraulic valve 12 moved by the armature 40.

In order to reduce friction between the armature 40 an inner surface 46 of the pole group 24 of the actuator 10 an air gap 48 is provided between an entirety of the enveloping surface 50 of the armature 40 and the inner surface 46, The air gap 48 is configured so that a constant distance is provided over a circumference of the armature 40 between the armature 40 and the pole group 24, this means the inner surface 46 in order to provide concentric support for the armature 40 in the pole group 24.

In the illustrated embodiment the armature 40 is movably received in the pole group 24 by a rod 54 that penetrates the armature 40 in its entirety. The rod 54 is arranged in a receiving opening 56 that penetrates the armature 40 in its entirety in an axial direction, wherein the rod is bonded to the armature 40. By the same token the rod can be connected with the armature 40 in a friction locking and/or form locking manner. For example the receiving opening 56 can be provided with an interior thread, wherein the rod 54 includes an exterior thread that is complementary thereto. In order to prevent a disengagement of the threaded connection during operations of the actuator 10 the rod 54 and the armature 40 can be bonded together at a face 58 of the armature 40 in order to prevent a relative movement of the two components.

As evident from FIG. 1 the rod 54 penetrates the terminal cover 31 in the illustrated embodiment. According to a non-illustrated embodiment, however, it is possible that the terminal cover 31 also provides complete closure and the rod 54 does not extend past the terminal cover 31 but is supported in a recess.

The receiving opening 56 is configured coaxial to an axis of symmetry 60 of the armature 40 that extends in the axial direction. This has the advantage that no transversal forces impact the armature 40 when the rod 54 moves since the armature 40 moves in a direction of the longitudinal axis 38 of the actuator 10. This advantage is augemented by supporting the rod 54 in the pole group 24. Friction loses can be minimized, in particular when the rod 54 has a minimum cross section and/or is supported in the pole group 24 with a small axial extension.

The rod 54 that is received in the receiving opening 56 extends beyond the faces 58. This means put differently that the rod 54 has a greater axial extension than the armature 40. This is advantageous since it facilitates supporting element end sections 62 of the rod 54 in the pole group 24 wherein the element sections 62 protrude beyond the armature 40. Thus, the rod 54 that includes a longitudinal element axis 64 configured coaxial with the armature 40. Thus, the longitudinal element axis 64 corresponds to the longitudinal symmetry axis 60.

The support of the rod 54 in the pole group 24 is configured by a first bearing opening 66 in the terminal cover 31 and a second bearing opening 68 that is configured in the support disc 44 so that a so called rod-rod support is implemented. This means put differently that the armature 40 is only in contact with the rod 54.

In order to reduce friction between the rod 54 and components 31, 44, including the support openings 66, 68 the support openings 66, 68 of the components 31, 44 configured as straight bearings either have a minimum axial extension or only portions of the components 31, 44 form the support surface.

The bearings formed by the support openings 66, 68 have a maximum distance from each other. Therefore the bearings 66, 68 are arranged at ends of the pole group 24. Due to the large distance of the bearings of the rod 54 an offset of the bearings in an active portion between the armature 40 and the inner surface 46 has a smaller effect than for a shorter distance of the bearings. This has the advantage that the armature 40 is concentrically moved in the axial direction in the interior cavity 36 which reduces resulting transversal forces.

The support openings 66, 68 that advantageously have a circular cross section are kept as small as possible in order to reduce friction. An absolute value of the diameter is a function of the armature 40 and its possible stroke and can therefore not be provided in absolute terms.

The support disc 44 can also be provided magnetic or magnetisable so that an anti-stick disc can be arranged at the armature 40 facing the support disc 44 in order to prevent an adhesion of the armature 40 at the support disc 44. By the same token the support disc 44 can also include the anti-stick disc so that the anti-stick disc is oriented towards the armature 40. In order to reduce a component number of the actuator 10 and in order to reduce the number of fabrication steps the pole group 24 can also be configured pot shaped wherein the terminal cover 31 or the support disc 44 is integrally fabricated in one piece with the pole group 24.

In order to implement an installation space optimized and in particular short actuator 10 the actuator 10 is configured to provide a hydraulic valve 12 that is short in a direction of the longitudinal axis 38. Thus, a cavity 70 is provided between the rod 54 and the armature 40 wherein the cavity 70 extends from the rod 54 in a radial and axial direction with reference to the longitudinal axes 38, 60, 64 in the armature 40. The cavity 70 is configured annular and thus completely envelops the rod 54 along a circumference of the rod 54. The installation space optimization is provided in that the rod bearing of the terminal cover 31 is at least partially moved into the cavity 70. Thus, the rod 54 can be shortened accordingly and does not protrude beyond the terminal cover 31 anymore or does only protrude by a small amount when the armature 40 is moved to the left in the drawing figure. It is also conceivable to configure a second cavity on another side of the armature 40 wherein the rod support of the support disc 44 is at least partially moved into the cavity.

The cavity 70 is provided outside a pole gap 72 that is configured between the pole tube 30 and the pole core 28. The pole gap 72 is a space without material between the pole tube 30 and the pole core 28 and is arranged in the portion of the connection bar 32. Put differently the pole gap 72 is enveloped by the pole core 28 or the pole core cone 34, the connection bar 32 and the pole tube 30 or the pole tube cone 35 and the by the carrier element 22 when the pole group 24 is installed.

The cavity 70 is either configured at the face 58 that is oriented towards the terminal cover 31 or at the face of 58 oriented towards the support disc 44 or at both faces 58. When the cavity 70 is arranged at both faces 58 the fixed connection of the armature 40 with the rod 54 is provided between both cavities 70. The cavity 70 helps to provide a weight reduced actuator 10 and a compact actuator 10 can be implemented which becomes even more compact when the support element 31, 44 that is oriented towards the cavity 70 or towards a respective cavity 70 when there are 2 cavities 70 protrudes into the cavity 70.

In order to securely support the armature 40 that is fixed at the rod 54 it is required to provide the respective bearings 66, 68 sufficiently long in the axial direction. In order for the compact actuator 10 to provide secure support even for a small overall axial length, it is provided that the bearing element 31, 44 that includes the bearing 66, 68 protrudes into the armature 40. Thus, the terminal cover 31 includes an annular boss 78 that is oriented towards the armature 40 and that can protrude in its entirety into the cavity 70 oriented towards the terminal cover 31.

In order to receive the support element 31, 44 the cavity 70 includes a diameter D which includes a movement gap between the boss 78 and the cavity 70 and has at least the same size as an outer diameter AA of the boss 78 or greater. The diameter D, however, has to be sized large enough so that a sufficient magnetic flux can be generated as a function of an outer diameter AK of the armature 40 to move the armature 40. Since the cavity 70 is formed in the armature 40, the armature 40 has two portions 84, 86.

By the same token also the support disc 44 can have a boss that is oriented towards the armature 40 and that can protrude into the armature 40 completely or at least partially.

The rod 54 is pressed into the armature 40 in the illustrated embodiments. By the same token the rod 54 can be made from a synthetic material and advantageously molded into the armature 40.

In another embodiment that is not illustrated in detail a boss is provided at an inner surface 46 of the pole group 24 in a portion of the pole tube 30 and of the connection bar 32, wherein the boss is formed by two different inner diameters of the inner cavity 36. The first interior diameter that is provided in the pole tube 30 and in a portion of the connection bar 32 is smaller than the second inner diameter which is configured in a remaining interior space 36. The boss helps to further reduce transversal forces upon the armature 40.

The boss is configured so that it overlaps the armature 40 in a direction of the terminal cover 31 but still within the connection bar 32 in an operating position of the armature 40 where it contacts the terminal cover 31. This means put differently that the armature 40 is enveloped in this operating position by the inner surface 46 with the larger inner diameter at least up to the boss starting from the pole tube 28. The boss helps to strip contaminant particles caused e.g. by mechanical abrasion or chipping residuals in the hydraulic fluid that is used to operate the hydraulic valve 12. This way it is prevented that contaminant particles reach an enveloping surface of the armature 40 and/or can attach thereto. Additionally the boss can be provided with a wiper edge wherein the wiper edge is configured as a bevel.

As an alternative to the embodiment described supra the boss can also be arranged at the armature 40. In this embodiment the inner cavity 36 has a constant inner diameter, however, the armature 40 has two different exterior diameters wherein the portion of the armature 40 with the larger diameter is oriented towards the terminal cover 31.

This embodiment of the actuator 10 described supra assures that the armature 40 is almost ideally arranged on the longitudinal axis 38 and moves thereon since the geometric tolerances, in particular due to machining the pole group in one clamping step are minimized and the actuator 10 can thus operate with low transversal force, low friction and thus in an energy efficient manner.

Figure 3:
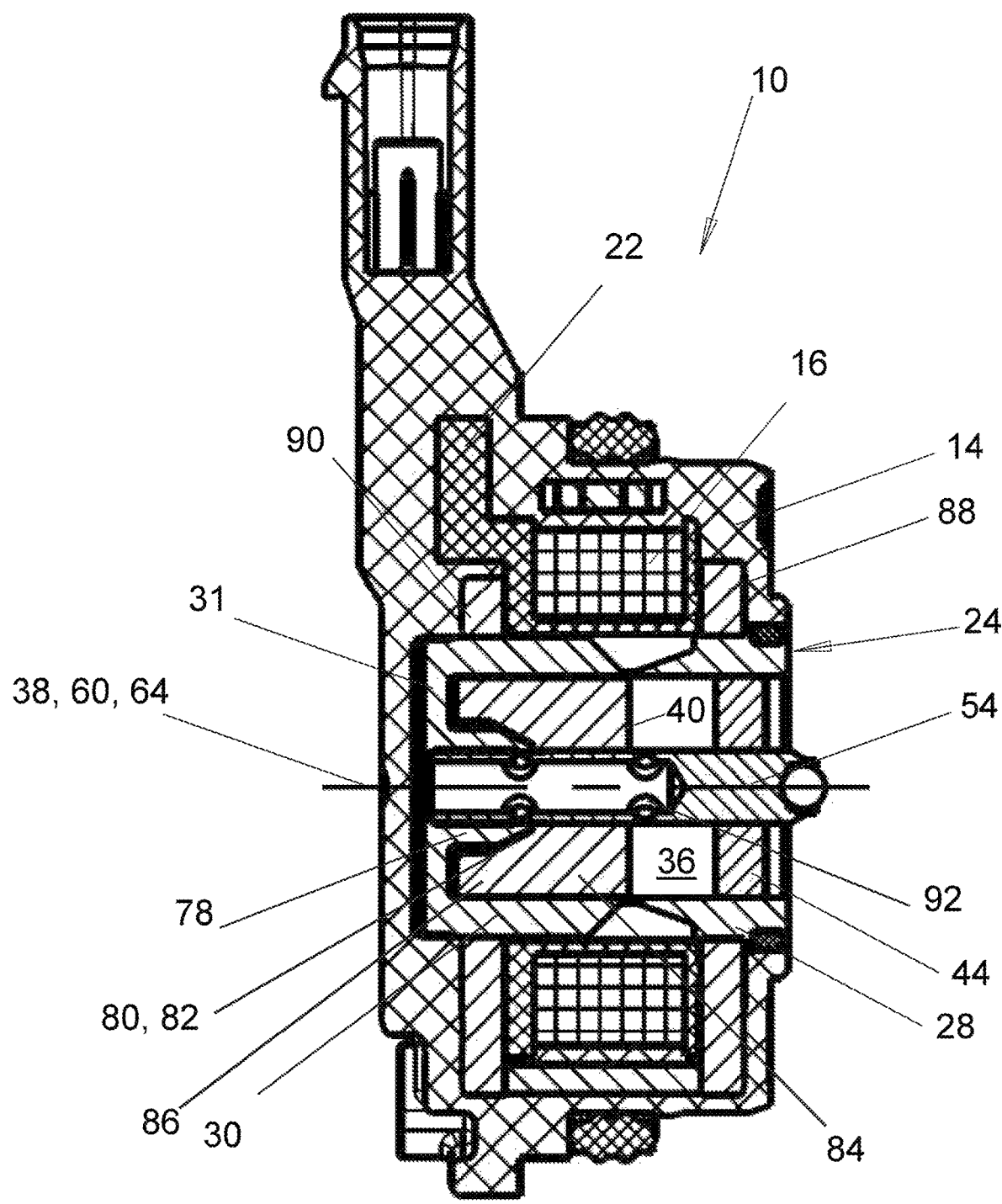
FIG. 3 illustrates a longitudinal sectional view of a second embodiment of an actuator according to the invention of a hydraulic valve according to the invention.
Figure 4:
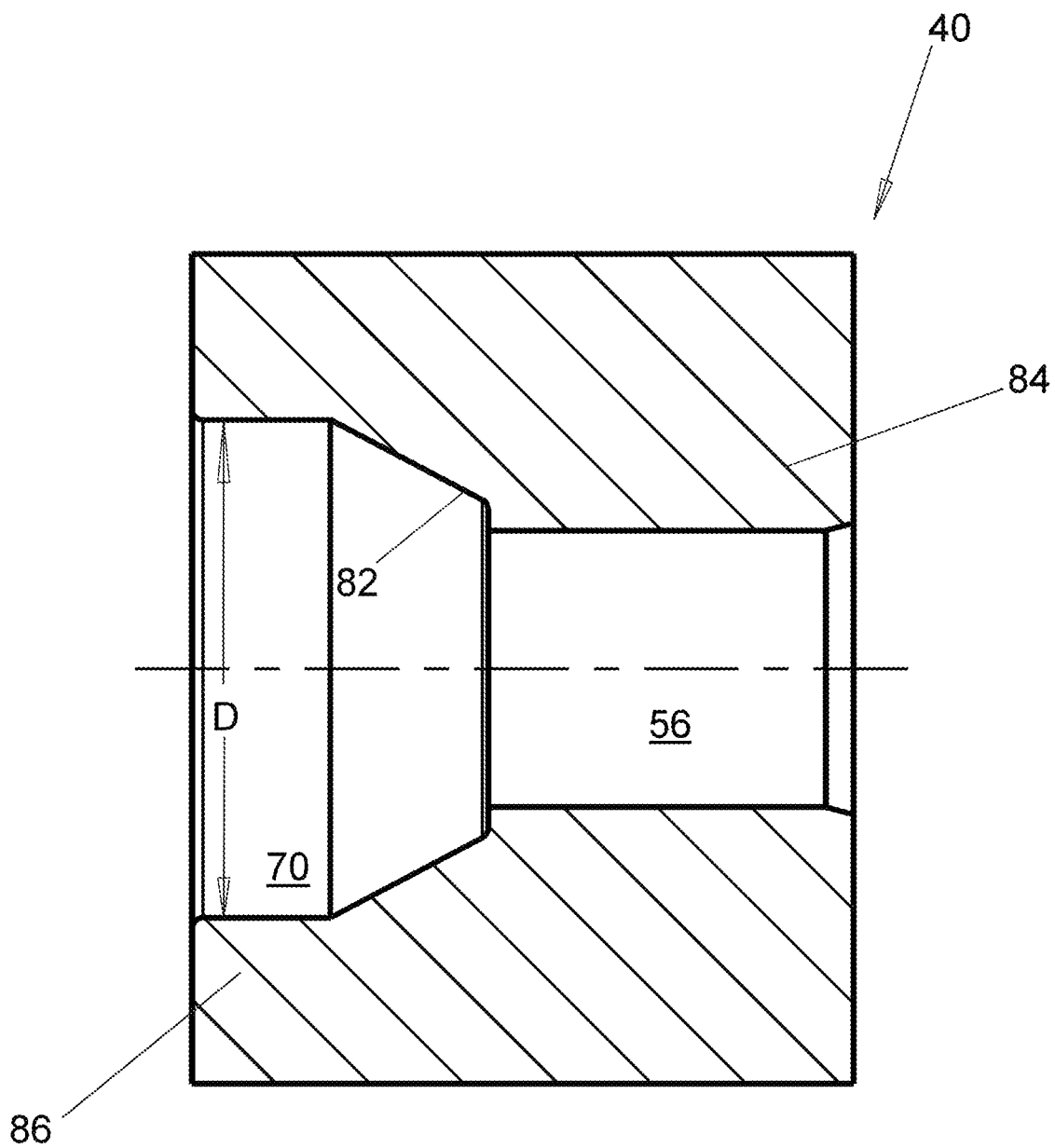
FIG. 4 illustrates an actuator according to FIG. 3 in a longitudinal sectional view.
Figure 5:
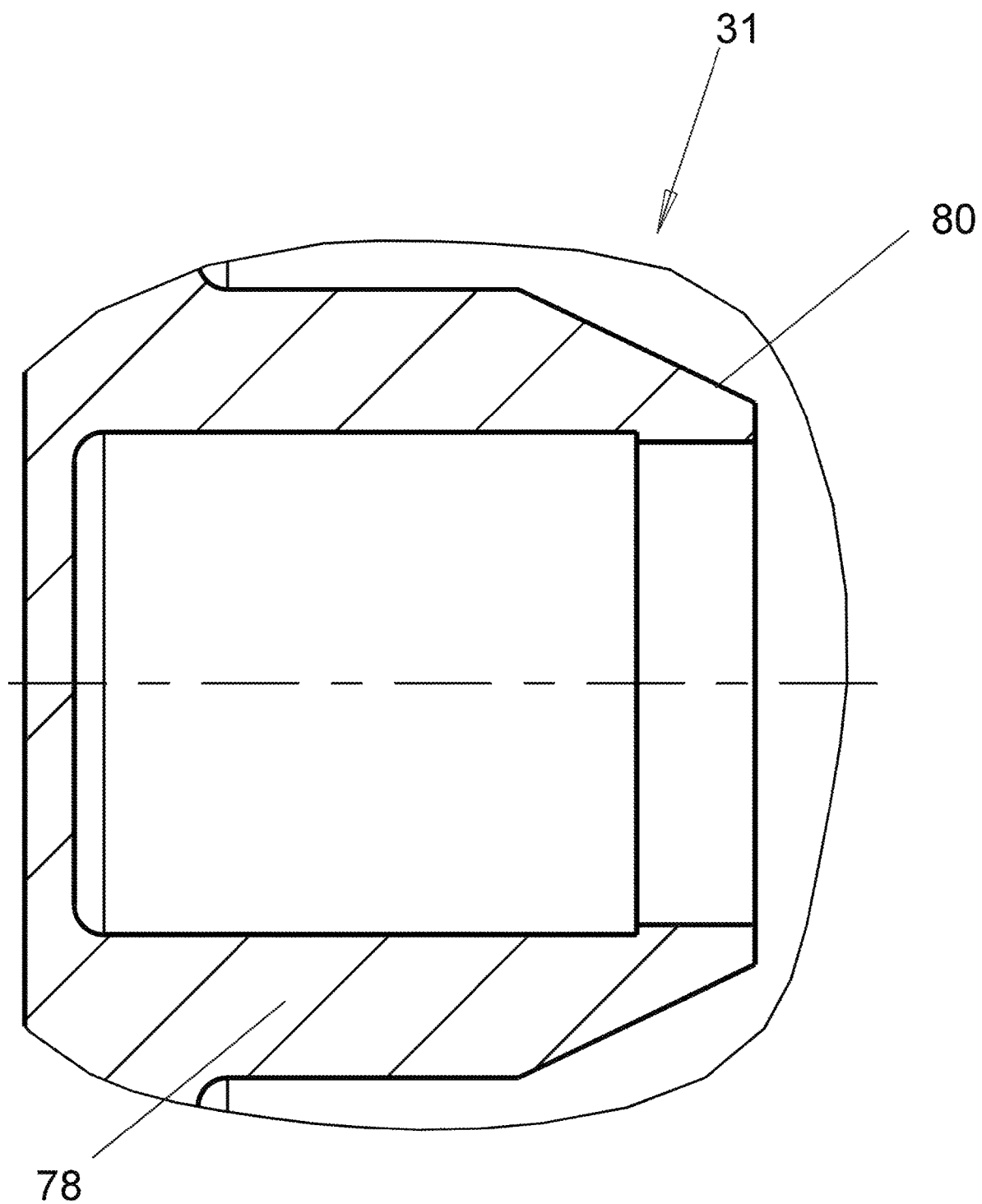
FIG. 5 illustrates a blown up detail of a terminal cover of the actuator according to FIG. 3 in a longitudinal sectional view.

FIGS. 3-5 respectively illustrate a second embodiment in a longitudinal sectional view, of an actuator 10 according to the invention showing a hydraulic valve 12 according to the invention wherein the armature 40 is in a left end position in the drawing figure. Differently from the first embodiment the terminal cover 31 is configured integrally in one piece with the pole group including the pole tube 30 and the pole core 28. An integral one piece pole group with the terminal cover 31 has the advantage that mechanical axes of the entire pole group 24 can be defined during fabrication, however, the two axes of the pole group and armature 40 can be brought into coaxial alignment or can be configured completely coaxial. This facilitates particularly advantageous running properties of the armature 40. In order to increase the bearing surface in this embodiment, the terminal cover 31 includes an annular boss 78 that is oriented towards the armature 40 wherein the annular boss can completely protrude into the cavity 70 of the armature 40 wherein the cavity 70 is oriented towards the terminal cover 31.

Due to the configuration of the cavity 70, the armature 40 includes the two armature portions 84, 86 wherein the armature portion 86 includes the cavity 70 in a radial direction with reference to the longitudinal axis 60. The armature portion 84 is only penetrated by the rod 54 that is arranged in the receiving opening 56. In order to improve the magnetic flux within the armature portions 84, 86 the annular boss 78 and the armature 40 respectively include corresponding bevels 80, 82. The bevel 80 is configured on an inside of the boss 78 that is oriented towards the armature 40 so that a wall thickness of the boss 78 decreases in a direction of the armature 40. The boss 78 is cylindrical on a side that is oriented towards the rod 54. The bevel 82 configured at the armature 40 forms a transition between the two armature portions 84, 86 and extends from the receiving opening 56 to the diameter D of the cavity 70.

Furthermore the embodiment of FIG. 3 differs from the preceding embodiment with respect to a configuration of the actuator housing 14 which is configured as an injection molded synthetic material housing as illustrated, wherein the magnet coil 16, the support element 22 and the pole discs 88, 90 are integrally molded into the housing.

The rod 54 that does not penetrate the actuator housing 14 is configured hollow with radial openings 92 in the portion of the armature 40 and facilitates a hydraulic fluid exchange in the interior cavity 36 (armature cavity), this means between a front side and a back side of the armature 40.

What is claimed is:

1. An actuator, the actuator comprising:
    a magnetisable actuator housing that envelops a magnet coil;
    a pole group that is arranged in a housing receiver opening of the magnetisable actuator housing,
    wherein the pole group includes a pole core and a pole tube,
    wherein the pole core and the pole tube are connected by a metal connection bar and the pole core is connected with the metal connection bar by a pole core cone, or the pole tube is connected with the metal connection bar by a pole tube cone,
    wherein an armature is received axially movable in an inner space of the pole group,
    wherein an axial movement of the armature is limited at a first armature face by a terminal cover of the pole group that is arranged opposite to the first armature face and the axial movement of the armature is limited at a second armature face by a support disc that is arranged opposite to the second armature face,
    wherein the armature is supported by a rod that extends through an entirety of the armature in an axial direction and provides a rod-rod support,
    wherein the armature is fixed at the rod,
    wherein a cavity is arranged between the armature and the rod and extends from the rod in a radial direction and in the axial direction,
    wherein the cavity is configured to at least partially receive the terminal cover or the support disc,
    wherein the rod-rod support is formed by supporting the rod in the terminal cover and in the support disc, and
    wherein the cavity is formed completely outside of a pole gap that is provided between the pole tube and the pole core when the coil is provided with current so that the armature is in contact with the support disc.

2. The actuator according to claim 1, wherein the cavity is annular and envelops an entirety of the rod.

3. The actuator according to claim 1,
    wherein the cavity is formed at the first armature face that is arranged opposite to the terminal cover or at the second armature face that is arranged opposite to the support disc, or
    wherein the cavity is formed at the first armature face that is arranged opposite to the terminal cover and at the second armature face that is arranged opposite to the support disc, and a fixed connection of the armature with the rod is configured between the cavity at the first armature face that is arranged opposite to the terminal cover and the second armature face that is arranged at the support disc.

4. The actuator according to claim 1, wherein the pole core and the support disc are integrally configured in one piece.

5. The actuator according to claim 1, wherein the pole tube and the terminal cover are integrally configured in one piece.

6. The actuator according to claim 1, wherein the terminal cover or the support disc include an annular boss that is oriented towards the armature and that is capable to protrude in its entirety into the cavity that is oriented towards the terminal cover.

7. The actuator according to claim 6, wherein in the annular boss and the armature respectively include corresponding bevels.

8. The actuator according to claim 1, wherein the pole core, the metal connection bar and the pole tube are configured integrally in one piece.

9. The actuator according to claim 1, wherein the rod is pressed into the armature or molded into the armature when the rod is made from a synthetic material.

10. A hydraulic valve, comprising: a control valve and the actuator according to claim 1 that moves the control valve.

* * * * *